(12) United States Patent
Schneider

(10) Patent No.: US 9,751,778 B2
(45) Date of Patent: Sep. 5, 2017

(54) SIMULTANEOUS RECOVERY OF COAGULANT AND ACID

(71) Applicant: AMERICAN WATER WORKS COMPANY, INC., Voorhees, NJ (US)

(72) Inventor: Orren D. Schneider, Plainsboro, NJ (US)

(73) Assignee: American Water Works Company, Inc., Voorhees, NJ (US)

( * ) Notice: Subject to any disclaimer, the term of this patent is extended or adjusted under 35 U.S.C. 154(b) by 286 days.

(21) Appl. No.: 14/707,570

(22) Filed: May 8, 2015

(65) Prior Publication Data
US 2015/0353388 A1 Dec. 10, 2015

Related U.S. Application Data

(63) Continuation-in-part of application No. 13/489,254, filed on Jun. 5, 2012.

(51) Int. Cl.
*C02F 1/44* (2006.01)
*C02F 1/68* (2006.01)
(Continued)

(52) U.S. Cl.
CPC .......... *C02F 1/4691* (2013.01); *B01D 61/243* (2013.01); *C02F 11/006* (2013.01);
(Continued)

(58) Field of Classification Search
CPC ...... C02F 1/26; C02F 9/00; C02F 1/66; C02F 1/52; C02F 11/006; C02F 1/4691;
(Continued)

(56) References Cited

U.S. PATENT DOCUMENTS 3,454,490 A * 7/1969 Wallace .............. B01D 61/246
210/321.6
4,609,469 A 9/1986 Keoteklian
(Continued)

OTHER PUBLICATIONS

Author: Tongwen Xu Title: Ion Exchange Membranes: State of their Development and Perspective Date: Aug. 15, 2005 Publisher: Journal of Membrane Science Edition or vol. 263 (2005) 1-29.
(Continued)

*Primary Examiner* — Ana Fortuna
(74) *Attorney, Agent, or Firm* — Shook, Hardy & Bacon L.L.P.

(57) ABSTRACT

Processes and systems are provided for simultaneously recovering coagulant and acid in a water treatment system. Sludge produced by the water treatment system is contacted with acid to form acidified sludge liquids. The acidified sludge liquids flow into a membrane assisted capacitive deionization system having both cation and anion exchange membranes. Metal cations from the acidified sludge liquids diffuse across at least one cation exchange membrane to form recovered coagulant, while anions from the acidified sludge liquids diffuse across at least one anion exchange membrane to form recovered acid. The diffusion rate of the metal cations across the cation exchange membranes is equal to or greater than the diffusion rate of the anions across the anion exchange membranes.

15 Claims, 11 Drawing Sheets

(51) Int. Cl.
    *C02F 1/26*     (2006.01)
    *B01D 11/04*     (2006.01)
    *C02F 1/469*     (2006.01)
    *B01D 61/24*     (2006.01)
    *C02F 11/00*     (2006.01)
    *C02F 1/52*     (2006.01)
    *C02F 1/66*     (2006.01)
    *C02F 11/12*     (2006.01)

(52) U.S. Cl.
    CPC .............. *C02F 1/44* (2013.01); *C02F 1/5245* (2013.01); *C02F 1/66* (2013.01); *C02F 11/12* (2013.01); *C02F 2303/16* (2013.01); *C02F 2303/18* (2013.01)

(58) Field of Classification Search
    CPC .... C02F 1/44; C02F 1/469; C02F 1/68; C02F 2303/18; B01D 61/243
    See application file for complete search history.

(56) References Cited

U.S. PATENT DOCUMENTS

| | | | |
|---|---|---|---|
| 2002/0179531 A1 | 12/2002 | SenGupta et al. | |
| 2006/0243604 A1 | 11/2006 | Nakagawa et al. | |
| 2011/0042320 A1* | 2/2011 | Allen | C02F 1/001 210/724 |
| 2012/0255903 A1* | 10/2012 | Kloos | B01D 61/16 210/608 |
| 2015/0353388 A1* | 12/2015 | Schneider | C02F 1/4691 210/638 |
| 2016/0045841 A1* | 2/2016 | Kaplan | B01J 19/0093 429/49 |
| 2016/0068417 A1* | 3/2016 | Buschmann | C02F 1/281 210/663 |

OTHER PUBLICATIONS

Title: Selective Coagulant Recovery from Water Treatment Plant Residuals using Donnan Membrane Process Date: Oct. 1, 2003 Publisher: Everon Sci Technol Edition or vol. 37(19):4468-74.
Title: Ion Exchange by Means of Donnan Dialysis as a Pretreatment Process Before Electrodialysis Date: 2006 Publisher: Environment Protection Engineering Edition or Volume: vol. 32, No. 2.
Non-Final Office Action dated Apr. 16, 2015 in U.S. Appl. No. 13/489,254, 17 pages.
Final Office Action dated Nov. 23, 2015 in U.S. Appl. No. 13/489,254, 19 pages.
Final Office Action dated Jul. 29, 2016 in U.S. Appl. No. 13/489,254, 17 pages.
Office Action dated Feb. 7, 2017 in U.S. Appl. No. 13/489,254, 18 pages.
T.A. Davis, "Donnan Dialysis." Membrane Separations, 2000, pp. 1701-1707.

* cited by examiner

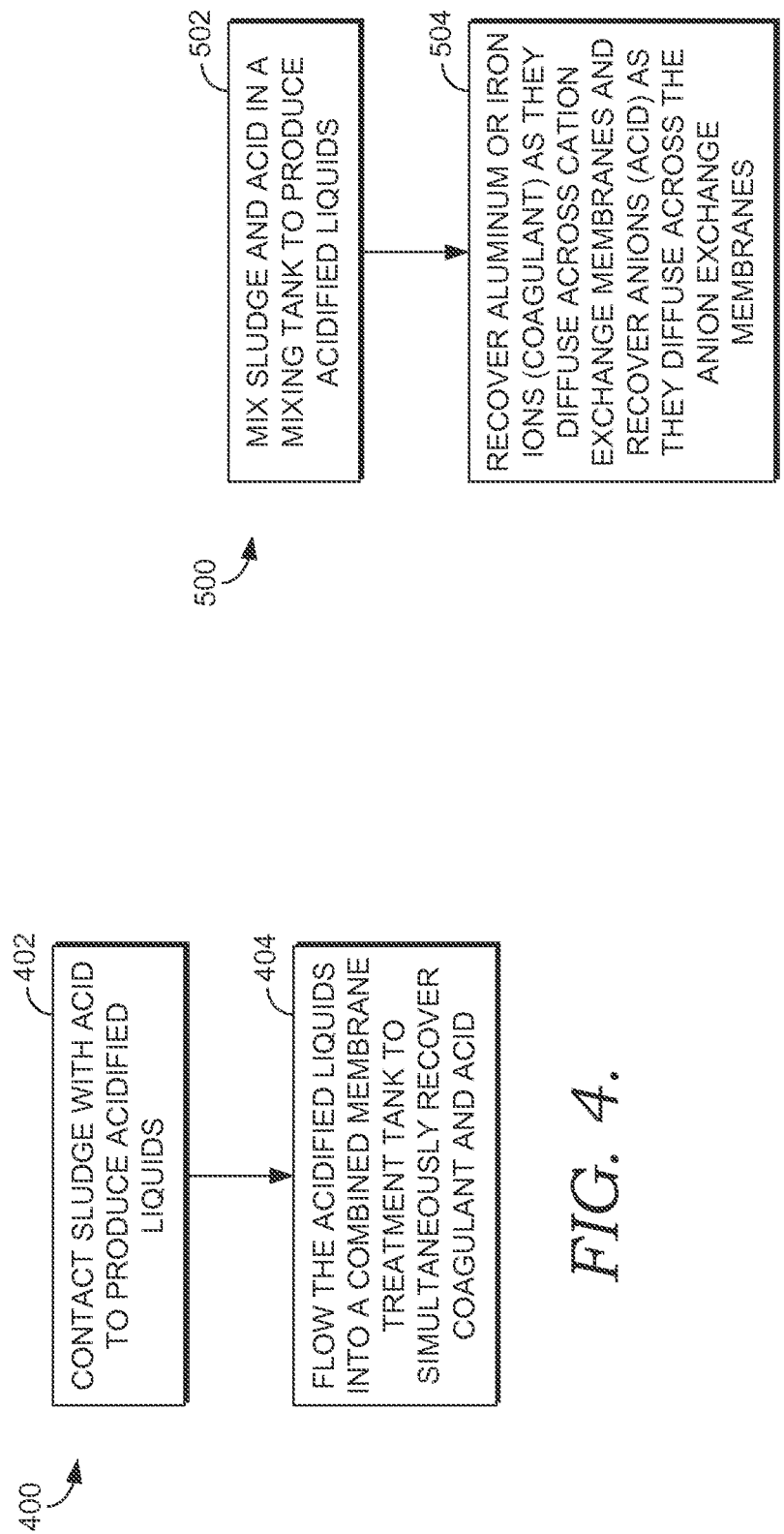

SIMULTANEOUS RECOVERY OF COAGULANT AND ACID

CROSS-REFERENCE TO RELATED APPLICATIONS

This application claims priority to U.S. application Ser. No. 13/489,254, entitled "SIMULTANEOUS RECOVERY OF COAGULANT AND ACID," filed Jun. 5, 2012, which is expressly incorporated by reference herein in its entirety.

BACKGROUND

The chemicals required in a water treatment plant may include chlorine, caustic, phosphates, lime/soda ash, fluoride, coagulants, and several others. Of these, the coagulants, such as alum, ferric chloride, or ferric sulfate, typically account for the largest portion of spending among these chemicals. Additionally, the used coagulants from a water treatment plant add to the amount of residuals that must be disposed of, which adds more cost to the total waste disposal cost of the plant. Coagulation is a process that provides for the removal of solids from the water, especially colloidal or very small particles. Additionally, organic matter and dissolved heavy metals are also removed by coagulation. Generally, coagulant chemicals are used to neutralize the electrical charges of the fine particles in the water, allowing the particles to move closer together and form larger clumps, which are then removed in the treatment process. When coagulant recovery is attempted in a drinking water treatment plant, acid is needed, which in addition to dissolving the precipitated coagulants can also solubilize the removed organic matter and heavy metals. The acid also counteracts the cost savings of recovering the coagulant. Because of these potential issues, coagulant recovery is rarely performed in drinking water treatment plants in the United States.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed description section below. This summary is not intended to identify key features or essential features of the claimed subject matter, nor is it intended to be used as an aid in isolation to determine the scope of the claimed subject matter. In brief and at a high level, this disclosure describes, among other things a process and system for simultaneously recovering coagulant and acid used in a water treatment system. Coagulant is used in the plant, and once used, is found in the sludge from the plant. In order to mobilize the coagulant when recovering the coagulant, acid is used to dissolve the sludge solids. Coagulant recovery without acid recovery, in some instances, may not save enough money to make the recovery efforts economically worthwhile, which is why acid recovery is also involved in the simultaneous recovery process described herein. Further, a separate acid recovery process also has many drawbacks, including having two separate tanks for coagulant and acid recovery and having to transport materials containing acid to different locations in the water treatment plant. As such, having a single membrane treatment tank that both recovers acid and coagulant simultaneously has many significant advantages, which will become more apparent as the processes and systems are described below. Water treatment plant or system, as used herein, may refer to a wastewater treatment plant (e.g., industrial wastewater treatment plant) or a drinking water treatment plant.

BRIEF DESCRIPTION OF THE SEVERAL VIEWS OF THE DRAWINGS

Illustrative embodiments of the present invention are described in detail below with reference to the attached drawing figures, and wherein:

FIGS. 4 and 5 are flow diagrams illustrating methods for simultaneously recovering coagulant and acid from acidified (dissolved) liquids, in accordance with embodiments of the present invention;

DETAILED DESCRIPTION

Figure 1:
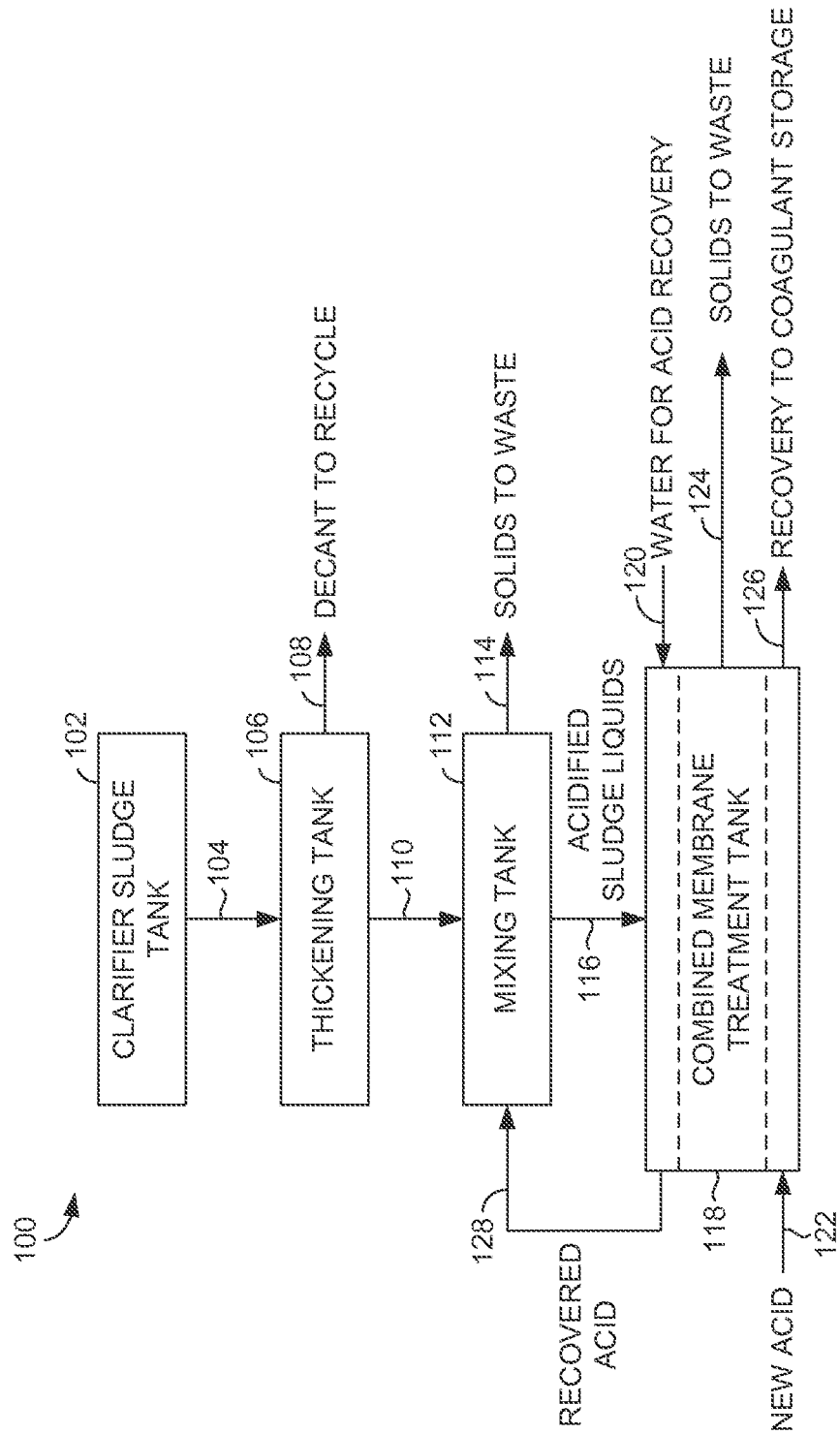
FIG. 1 illustrates a process flow diagram of a portion of a water treatment system, in accordance with an embodiment of the present invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In a first aspect of the present invention, a process is provided for simultaneously recovering coagulant and acid in a water treatment system. The process includes contacting sludge from a water treatment system with acid to produce acidified liquids, and flowing the acidified (dissolved) liquids into a combined membrane treatment tank that comprises cation exchange membranes and anion exchange membranes to simultaneously recover the coagulant and the acid from the acidified liquids. Metal cations diffuse across the cation exchange membranes and the anions diffuse across the anion exchange membranes to form a recovered coagulant stream and a recovered acid stream. The diffusion rate of the metal cations across the cation exchange membranes is equal to or greater than the diffusion rate of the anions across the anion exchange membranes.

In a second aspect of the present invention, a process is provided for simultaneously recovering coagulant and acid in a water treatment system. The process includes, upon utilizing the coagulant in the water treatment system where sludge is produced, mixing the sludge in a mixing tank with acid to produce waste solids and acidified liquids. The acid is one or more of new acid or recovered acid, and the coagulant is one of an aluminum coagulant or an iron coagulant. Further, the process includes, in a combined membrane treatment tank having cation exchange membranes and anion exchange membranes, recovering aluminum or iron ions as they diffuse across the cation exchange membranes into an acid solution cell and react with a sulfuric acid solution or a hydrochloric acid solution to form recovered coagulant. Further, the process includes recovering anions as they diffuse across the anion exchange membranes into a water cell to form the recovered acid.

In a third aspect of the present invention, a system is provided for simultaneously recovering coagulant and acid in a water treatment system. The system includes a mixing tank that receives and mixes sludge from the water treatment system and a first acid stream to form acidified liquids and waste solids, the first acid stream being recovered acid or new acid. The system further includes a combined membrane treatment tank that receives the acidified liquids from the mixing tank, water, and a second acid stream to form the recovered acid and recovered coagulant. The combined membrane treatment tank is used to simultaneously recover the coagulant from the acidified liquids and at least a portion of the first acid stream, and the diffusion rate of metal cations across cation exchange membranes in the combined membrane treatment tank is equal or greater than the diffusion rate of anions across the anion exchange membranes in the combined membrane treatment tank.

In a fourth aspect herein, a process is provided for recovering coagulant and acid in a water treatment system. The process comprises contacting sludge from a water treatment system with acid to produce acidified sludge liquids, and flowing the acidified sludge liquids into a membrane assisted capacitive deionization system that comprises at least one cathode that is separated by a first flow spacer from at least one cation exchange membrane and at least one anode that is separated by a second flow spacer from at least one anion exchange membrane to recover the coagulant and the acid from the acidified sludge liquids. The process further comprises initiating a charging phase of the membrane assisted capacitive deionization system where an electric voltage difference is applied between the at least one cathode and the at least one anode. During at least a portion of the charging phase, metal cations diffuse across the at least one cation exchange membrane and the first flow spacer to temporarily immobilize at the at least one cathode, and anions diffuse across the at least one anion exchange membrane and the second flow spacer to temporarily immobilize at the at least one anode. Further, the process comprises initiating a charge relaxation/reversal phase during which the coagulant and the acid from the first and the second flow spacers are recovered. The electric voltage difference between the at least one cathode and the at least one anode is either reduced to zero or the polarity is reversed. Additionally, the process comprises recycling recovered acid from the second flow spacer adjacent to the at least one anode to the first flow spacer adjacent to the at least one cathode.

In a fifth aspect herein, a process is provided for recovering coagulant and acid in a water treatment system. The process comprises, upon utilizing the coagulant in the water treatment system where sludge is produced, mixing the sludge in a mixing tank with the acid to produce waste solids and acidified sludge liquids. The coagulant is a polyvalent metal coagulant. In a membrane assisted capacitive deionization system having at least one cathode that is separated with a first flow spacer from at least one cation exchange membrane and at least one anode that is separated with a second flow spacer from at least one anion exchange membrane, the process comprises initiating a charging phase by applying an electric voltage difference between the at least one cathode and the at least one anode to separate aluminum or iron ions from anions during the charging phase. The aluminum or iron ions diffuse across the at least one cation exchange membrane and the first flow spacer to temporarily immobilize at the at least one cathode, and the anions diffuse across the at least one anion exchange membranes and the second flow spacer to temporarily immobilize at the at least one anode during the charging phase. Further, the method comprises initiating a charge relaxation/reversal phase to recover the aluminum or iron ions as they diffuse into the first flow spacer between the at least one cathode and the at least one cation exchange membrane. The aluminum or iron ions react with a sulfuric acid solution or a hydrochloric acid solution to form recovered coagulant during the charge relaxation/reversal phase. The process additionally comprises recovering the anions as they diffuse into the second flow spacer between the at least one anode and the at least one anion exchange membrane to form recovered acid during the charge relaxation/reversal phase.

In a sixth aspect herein, a system is provided for recovering coagulant and acid in a water treatment system. The system comprises a mixing tank that receives and mixes sludge from the water treatment system and an acid stream to form acidified sludge liquids and waste solids, and a membrane assisted capacitive deionization system that receives the acidified sludge liquids from the mixing tank and flush water or dilute acid to form recovered acid and recovered coagulant. The membrane assisted capacitive deionization system is used to recover the coagulant from the acidified liquids and at least a portion of the acid stream. Further, a flow rate of the flush water in a flow spacer between at least one cation exchange membrane and at least one anion exchange membrane is greater than a diffusion rate of metal cations through the at least one cation exchange membrane or a diffusion rate of anions the through at least one anion exchange membrane in the membrane assisted capacitive deionization system.

In a seventh aspect herein, a process is provided for recovering coagulant and acid in a water treatment system. The process comprises, upon utilizing the coagulant in the water treatment system where sludge is produced, mixing the sludge in a mixing tank with the acid to produce waste solids and acidified sludge liquids. The coagulant is one of an aluminum coagulant or an iron coagulant or any polyvalent metal coagulant. In a membrane assisted capacitive deionization system having at least one cathode that is mounted directly on to at least one cation exchange membrane and at least one anode that is mounted directly on to at least one anion exchange membrane, the process comprises initiating a charging phase by applying an electric voltage difference between the at least one cathode and the at least one anode to separate aluminum or iron ions from anions during the charging phase. The aluminum or iron ions, from the acidified sludge liquids feed flow, diffuse from the flow spacer across the at least one cation exchange membrane to temporarily immobilize at the at least one cathode, and the anions diffuse across the at least one anion exchange membranes to temporarily immobilize at the at least one anode during the charging phase. Once the cathode is saturated with the metal ions, the acidified sludge liquids feed flow is stopped and the system is flushed with water and the resulted waste is recycled to the feed. Moreover, the method comprises initiating a charge relaxation/regeneration phase while feeding the MCDI system with acid (either hydrochloric acid or sulfuric acid) to recover the aluminum or iron ions and the anions as they diffuse back to the flow spacer between the at least one cation exchange membrane and the at least one anion exchange membrane. The aluminum or iron ions and the anions in the flow spacer react with a sulfuric acid solution or a hydrochloric acid solution to form recovered coagulant during the charge relaxation/regeneration phase. Once the relaxation phase is complete and the coagulant and acid are recovered, the process is repeated and the feed with the acidified sludge liquids is restarted.

In an eighth aspect herein, a system is provided for recovering coagulant and acid in a water treatment system. The system comprises a mixing tank that receives and mixes sludge from the water treatment system and an acid stream to form acidified sludge liquids and waste solids, and a membrane assisted capacitive deionization system that receives the acidified sludge liquids from the mixing tank and flush dilute acid to recover acid and coagulant. The membrane assisted capacitive deionization system is used to recover the coagulant from the acidified liquids and at least a portion of the acid stream. The membrane assisted capacitive deionization system used in this aspect, has at least one cation exchange membrane mounted directly on to at least one cathode that are separated by a flow spacer from at least one anion exchange membrane that is mounted directly on to a at least one anode.

Referring to the drawings in generally and initially to FIG. 1, FIG. 1 illustrates a process flow diagram 100 of a portion of a water treatment system, in accordance with an embodiment of the present invention. Water treatment plant or system, as used herein, may refer to a wastewater treatment plant (e.g., industrial wastewater treatment plant) or a drinking water treatment plant. The process flow diagram 100 represents just a portion of a water treatment plant that intakes water and outputs clean water that can be reused. It should be noted that while four tanks are illustrated in the embodiment of FIG. 1, there may be more or less tanks used to accomplish embodiments of the present invention described herein, which include to simultaneously recover coagulant used in the water treatment plant and recover acid used to recover the coagulant. The portion illustrated in FIG. 1 begins with a clarifier sludge tank 102 that intakes sludge from the water treatment plant and clarifies it. The output of this tank is clarified sludge 104, which flows into a thickening tank 106. The thickening tank 106 thickens the clarified sludge 104 by extracting water out of the clarified sludge, which is the decant stream 108 that may be recycled. Decant, generally, is the liquid that is separated from the stream that includes the solids, which, here, is the thickened sludge 110. The thickened sludge 110 flows into a mixing tank 112 where acid 128 is mixed with the thickened sludge 110. The acid dissolves a majority of the thickened sludge. In one instance, the mixing tank 112 is an acid resistant tank. In one embodiment, the acid 128 is recovered acid from the process described herein, but in another embodiment, the acid 128 is new acid that has not previously been used in the plant. Typically, when alum is used as the coagulant, sulfuric acid is used to acidify the solids. When ferric chloride is used as the coagulant, hydrochloric acid is used to acidify the solids. Similarly, when ferric sulfate is used as the coagulant, sulfuric acid is used as the acid. As such, either sulfuric acid or hydrochloric acid is recovered in the process described herein.

Aluminum coagulants are typically purchased as commercial grade alum (aluminum sulfate), which is manufactured commercially by several methods often by reacting aluminum hydroxide (sometimes in the form of high alumina clays such as kaolin or bauxite) with sulfuric acid, according to the formula below:

$$2Al(OH)_3 + 3H_2SO_4 + xH_2O \rightarrow Al_2(SO_4)_3 \cdot (6+x)H_2O$$

Iron coagulants are typically in the form of ferric chloride or ferric sulfate. Commercial grade ferric chloride is manufactured by the exothermic reaction between ferric oxide and hydrochloric acid, according to the formula below:

$$Fe_2O_3 + 6HCl \rightarrow 3H_2O + 2FeCl_3$$

Or, alternatively, by dissolving iron ore in hydrochloric acid, according to the formula below:

$$Fe_3O_4 + 8HCl \rightarrow FeCl_2 + 2FeCl_3 + 4H_2O$$

Another iron coagulant that may be used is ferric sulfate, which is produced on a large scale by reacting sulfuric acid, a hot solution of ferrous sulfate, and an oxidizing agent (such as nitric acid or hydrogen peroxide), according to the formula below:

$$6FeSO_4 + 3H_2SO_4 + 2HNO_3 \rightarrow 3Fe_2(SO_4)_3 + 4H_2O + 2NO$$

Various coagulant recovery methods have been tested and used in the past, but due to the relatively low cost of the commodity materials (alum or ferric salts) and required capital expenditures, it has not been widely used. Coagulant recovery is generally based on dissolution of the sludge and may or may not be followed by a purification step. The dissolution of sludge is based on the solubility of aluminum (or iron) hydroxide residuals at either low or high pH. Alkalization, acidification, liquid ion exchange, and resin-based ion exchange are just a few of the methods that have been tested and used in the past.

Returning to FIG. 1, acidified (dissolved) liquids 116 are produced in the mixing tank 112 and flow to a combined membrane treatment tank 118, which includes both cation and anion exchange membranes. The cation exchange membranes allow the trivalent aluminum ions to pass through to the other side, thus recovering the coagulant. This step can be explained by the term Donnan dialysis. Donnan dialysis, also called diffusion dialysis, operates on the basis of an ion exchange membrane. Unlike other commonly used membrane processes (e.g., microfiltration or reverse osmosis), Donnan dialysis does not operate on the basis of pressure differential, but rather operates based on differences in electrochemical potential. The electrochemical potential of an ion in solution is essentially based on the charge and concentration of the ion. This is formally expressed as:

$$\mu_i = \mu_i^0 + RT \ln a_i + z_i F \phi$$

Where $\mu_i$ is the chemical potential of any species, i, in solution; the superscript 0 denotes the standard state; $a_i$ is the activity of the species; $z_i$ is the valency of the ion; F is the Faraday Constant; R is the ideal gas constant; T is the absolute temperature, and $\phi$ is the electrical potential At equilibrium, the electrochemical potential of ions on either side of the membrane will be the same. Under non-equilibrium conditions, ions will migrate in order to achieve the equilibrium condition.

If an ionic solution is divided by a cation exchange membrane that allows only cations to pass, cations will permeate from one side of the membrane to the other. In order to maintain electroneutrality on both sides of the membrane, protons (hydrogen ions) will counter-permeate. Thus, at equilibrium, the following expression holds:

$$\left(\frac{C_M^F}{C_M^S}\right) = \left(\frac{C_H^F}{C_H^S}\right)^Z$$

where C is the molar concentration of a metal, M, and hydrogen, H, respectively. Z is the valency of the metal ion (+2 for zinc, +3 for aluminum), and F and S are the feed and sweep sides of the membrane.

Figure 3:
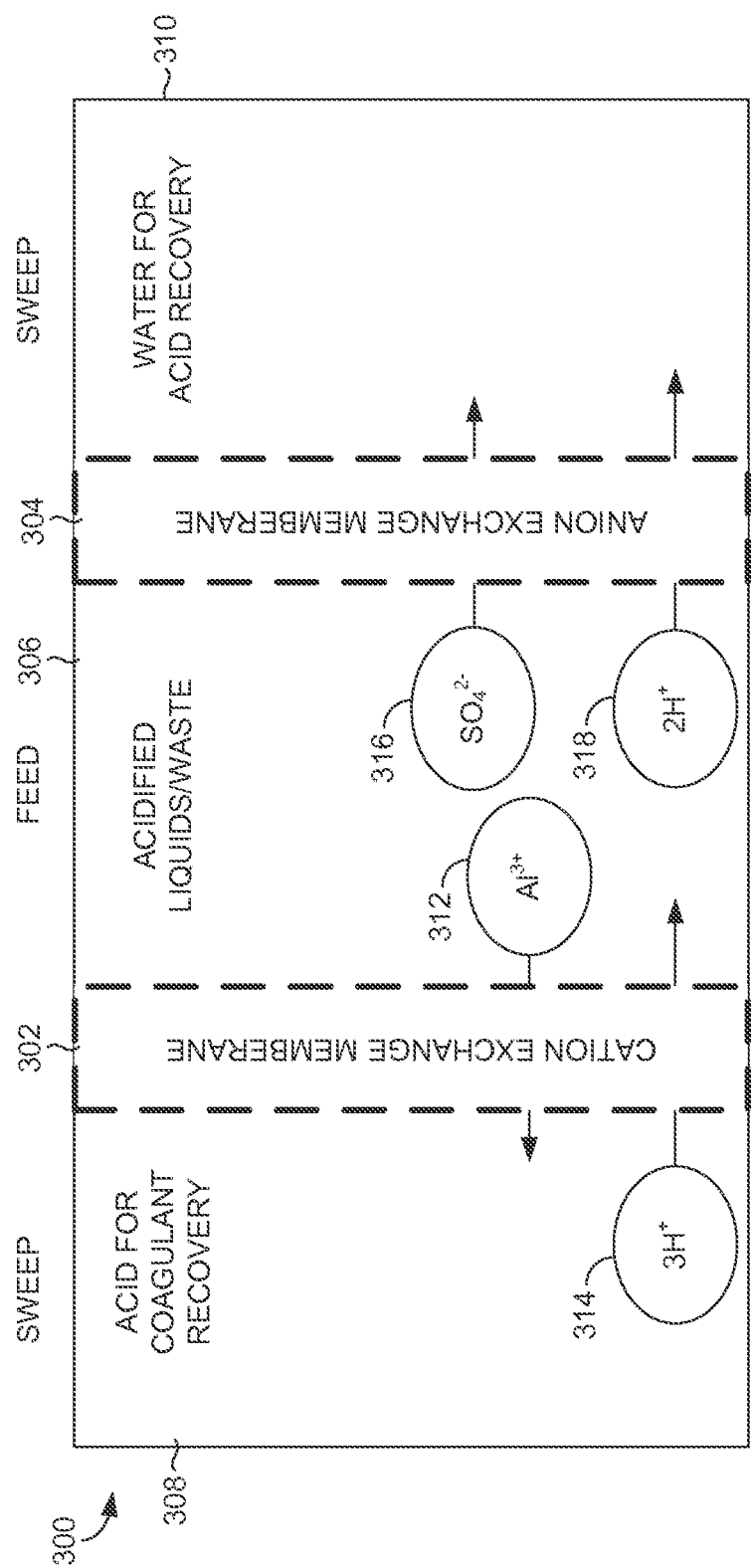
FIG. 3 illustrates a schematic diagram of a simultaneous coagulant and acid recovery process, in accordance with an embodiment of the present invention.

Because a cation exchange membrane is used, negatively charged species such as sulfate or natural organic matter (NOM) are excluded from crossing the membrane. Protozoan contaminants such as *Cryptosporidium* oocysts or *Giardia* cysts being negatively charged above pH 3 are also prevented from crossing the membrane. Thus, a high degree of purification is achieved. When applied to coagulant recovery, sludge would be acidified using sulfuric acid to liberate aluminum (or iron, if used) from the hydroxide precipitate. The liquid would be decanted into a membrane tank (or stack) containing a cation exchange membrane with dilute acid on the permeate side, also called the sweep. The free coagulant would then be allowed to diffuse into the sweep acid. This is illustrated in FIG. 3, which will be discussed in more detail below.

In essence, the equation above states that if the molar ratio of acid on the two sides of the membrane is 10 (a pH difference of 1.0 unit), then the molar aluminum ratios at equilibrium will be 1000 ($10^3$). Larger pH differences will result in greater driving forces. Thus, by maintaining a difference in pH across the membrane, aluminum diffuses, even from a low concentration into a high concentration. Importantly, divalent cations (such as a number of heavy metals including zinc and copper) will diffuse to a lesser extent ($10^2$), reducing contamination of the recovered alum or iron coagulant.

The concentration of the aluminum in the recovered alum would be dependent on the kinetics of the exchange (based on the diffusion of aluminum through the membrane) as well as the volume and concentration of the acid sweep. Bench testing of the system performed by scientists and researchers in the field has shown an aluminum recovery in excess of 70%. Experiments with iron showed ferric ion recovery of 75%.

Once again in reference to FIG. 1 and as discussed above, the coagulant (e.g., trivalent aluminum ions or iron) diffuses through the cation exchange membranes and into a sweep solution (e.g., diluted acid) of either sulfuric acid or hydrochloric acid (depending on the coagulant). The purified material, or recovered coagulant 126, can then be reused as a coagulant in the water treatment plant. In the process of coagulant recovery as described above, the residual stream becomes more highly acidified. The acid is then recovered on the alternating side through anion exchange membranes into a sweep solution of potable water. The overall reduction in solids may be between 40-50%. This, along with the acid and coagulant recovery, provides for reduced overall plant operation costs by reducing the amount of coagulant that needs to be purchased. Additionally, the quantity of residuals that are removed from the site and disposed of is also greatly reduced. The recovered acid, for instance, may be used to acidify more sludge. The final residuals (solids), or waste solids 124, are neutralized with lime in one embodiment, and are disposed of accordingly. Along with acid 122, water 120, such as potable water, is used for the acid recovery process within the combined membrane treatment tank. In one embodiment, the acid 122 added to the combined membrane treatment tank 118 is new acid, but in another embodiment, it is recovered acid from the acid recovery process described herein.

As mentioned, the anion exchange membranes in the combined membrane treatment tank 118 use ion exchange to remove acid anions (e.g., sulfate or chloride) while rejecting divalent cations (e.g., metals) and larger organics. Unlike the coagulant recovery process described above, however, there is a net transfer from the sweep solution. In addition to the acid anion transfer, in order to maintain electroneutrality, protons also transfer from the feed side into the sweep. When combined with the protons transferred during the coagulant recovery step, the recovery of acid is greater than the amount required to dissolve the sludge. Thus, the process is self-sustaining, as no new acid is required to dissolve additional volumes of sludge. The only new acid required is that used for recovery of the coagulant. As described herein, the combined membrane treatment tank is a single tank that simultaneously recovers acid and coagulant. There are numerous advantages of simultaneously recovering acid and coagulant in a single tank, such as not having to transport acid from one tank to another, and having all of the membranes in a single tank. It is also a more efficient process to simultaneously recover the acid and coagulant in a single tank. Fewer pumps, tanks, valves, pipes, etc. are needed in the plants.

As will be discussed in more detail herein, the combined membrane treatment tank 118 includes alternating cationic and anionic exchange membranes that are arranged to allow the aluminum (or acid) and acid recovery process to occur simultaneously such that the aluminum or iron diffuses into one stream and the sulfate or chloride and hydrogen ions diffuse into a second stream. This combined process results in a smaller footprint and reduced tankage and pumpage. As such, fewer and perhaps smaller pumps may be needed, and transporting acid to different tanks becomes less of an issue, as the tanks are combined into the combined membrane treatment tank 118. In order to maintain a balance in the diffusion of hydrogen ions, in addition to preventing precipitation of metals in the sludge, the membranes may have nearly identical aluminum or iron and sulfate or chloride diffusion rates. In one embodiment, the aluminum or iron has a higher diffusion rate than the sulfate or chloride, but in another embodiment, the diffusion rates are approximately equal. If the sulfate or chloride has a higher diffusion rate than the aluminum or iron, the pH may increase resulting in precipitation of solids.

Generally, the combined membrane treatment tank 118, as mentioned has alternating cation and anion exchange membranes. In one embodiment, the order of cells may be a water/acid cell, an acidified liquids/waste cell, an acid/coagulant cell, an acidified liquids/waste cell, and a water/ acid cell. As such, the order of membranes in this embodiment is an anion exchange membrane, two cation exchange membranes, and then another anion exchange membrane. This order of cells and membranes may continue multiple times, and collectively, this is referred to as the combined membrane treatment tank 118. In another embodiment, one combined membrane treatment tank 118 may be used, but once the metal cations diffuse through the cation exchange membranes and react with acid, the remaining acidified material is placed in another portion of the membrane treatment tank where the material diffuses through an anion exchange membrane to recover acid. The recovered acid may be used for acidifying new sludge from the water treatment plant. What remains of the acidified sludge is neutralized, such as with lime, prior to disposal.

Figure 2:
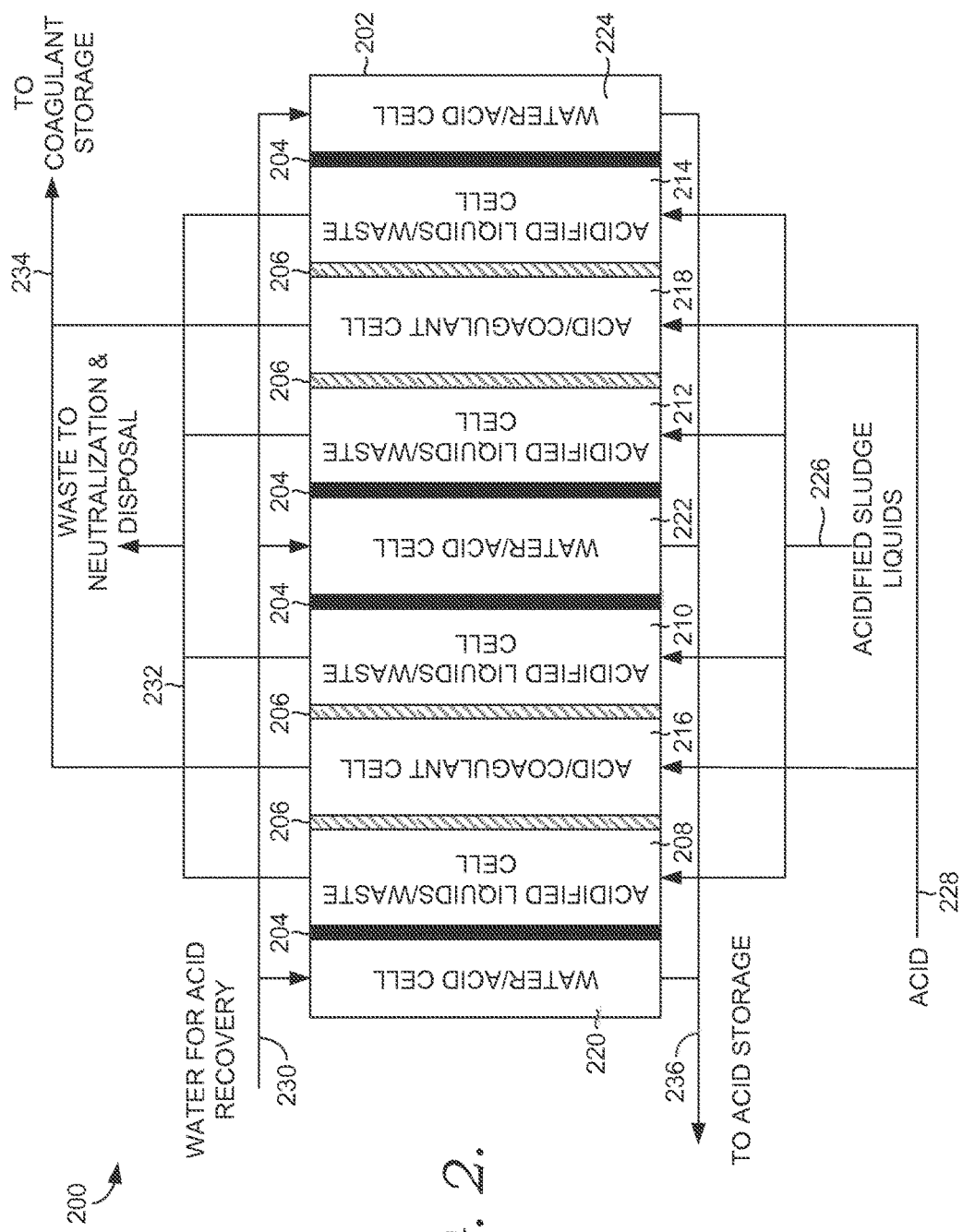
FIG. 2 illustrates a process flow diagram of a combined membrane treatment tank for simultaneously recovering acid and coagulant, in accordance with an embodiment of the present invention.

Turning now to FIG. 2, a process flow diagram 200 illustrates a combined membrane treatment tank for simultaneously recovering acid and coagulant, in accordance with an embodiment of the present invention. The combined membrane treatment tank 202 contains both cation and anion exchange membranes. The cation exchange membranes 206 allow for the aluminum or iron to pass through to the acid/coagulant cells 216 and 218, but do not allow the acid (e.g., sulfate or chloride ions) to pass through, thus allowing for the recovery of the materials used for the coagulant in the water treatment plant. The anion exchange membranes 204, on the other hand, allow the acid (e.g., sulfate or chloride ions) to pass through to the water/acid cells 220, 222, and 224, but do not allow the aluminum or iron ions to pass through, thus allowing for the recovery of the acid used both to acidify the sludge and the acid added to the combined membrane treatment tank 202, as will be further discussed herein.

The combined membrane treatment tank 202 contains various cells, including acidified liquids/waste cells 208, 210, 212, and 214, acid/coagulant cells 216 and 218, and water/acid cells 220, 222, and 224. While the cells mentioned above are illustrated in FIG. 2, the arrangement of cation/anion exchange membranes and of the various cells is just one embodiment of the invention, as alternative arrangements may also be used to carry out other embodiments of the present invention. The input to the acidified liquids/waste cells 208, 210, 212, and 214 is the acidified sludge liquids 226. As previously mentioned, sludge from the water treatment plant may first be clarified, thickened, and mixed with acid to form acidified sludge liquids, as shown in FIG. 1 herein. These liquids then enter the combined membrane treatment tank 202 into the acidified liquids/waste cells 208, 210, 212, and 214. As mentioned, the aluminum or iron from the acidified sludge liquids 226 passes through the cation exchange membranes 206 to the acid/coagulant cells 216 and 218, as the sulfate or chloride passes through the anion exchange membranes 204 into the water/acid cells 220, 222, and 224. The waste or liquids 232 that is not recovered exits the acidified liquids/waste cells 208, 210, 212, and 214 and is neutralized (e.g., with lime) and properly disposed of. Using the processes and systems described herein, the amount of waste that is disposed of is greatly reduced because of the coagulant and acid recovery.

Acid 228 enters the combined membrane treatment tank 202 by way of the acid/coagulant cells 216 and 218. The acid 228 in these cells reacts with the aluminum or iron that has passed through the cation exchange membranes 206 to produce coagulant 234, as the aluminum or iron reacts with the acid. The type of acid used (e.g., sulfuric acid or hydrochloric acid) depends on the type of coagulant used in the water treatment plant. For example, an aluminum-based coagulant (e.g., alum) reacts with sulfuric acid, while an iron-based coagulant (e.g., ferric chloride) reacts with hydrochloric acid. Additionally, if ferric sulfate is the coagulant used in the plant, sulfuric acid is used. In one embodiment, alum is the coagulant used in the water treatment plant. In this case, trivalent aluminum ions ($Al^{3+}$), as mentioned, pass through the cation exchange membranes 206 from the acidified liquids/waste cells 208, 210, 212, and 214 to the acid/coagulant cells 216 and 218. For each aluminum or iron molecule that is exchanged, three hydrogen ions pass through the cation exchange membranes 206 the opposite way, or from the acid/coagulant cells 216 and 218 to the acidified liquids/waste cells 208, 210, 212, and 214. This creates a net gain of aluminum in the acid/coagulant cells 216 and 218 and a net gain of one proton in each of the acidified liquids/waste cells 208, 210, 212, and 214, as will be discussed further herein. The recovered coagulant 234 that exits the combined membrane treatment tank 202 through the acid/coagulant cells 216 and 218 is taken to coagulant storage so that it can be reused in the water treatment plant.

Water 230, such as, for example, potable water, enters the combined membrane treatment tank 202 by way of one of the water/acid cells 220, 222, and 224. As mentioned, the sulfate or chloride passes through the anion exchange membranes 204 and enters the water/acid cell 220, 222, or 224. In addition, two hydrogen ions also pass through the anion exchange membrane into the water/acid cell 220, 222, or 224, which is how there is a net gain of one proton in each of the acidified liquids/waste cells 208, 210, 212, and 214. This will become more apparent during the discussion of FIG. 3 below. As such, there is a net gain of sulfate or chloride and the hydrogen ions (protons) in the water/acid cells 220, 222, and 224.

Turning to FIG. 3, a schematic diagram of a simultaneous coagulant and acid recovery process is illustrated, in accordance with an embodiment of the present invention. Initially, the combined membrane treatment tank, referred to as numeral 300, includes both cation and anion exchange membranes. The cation exchange membrane 302, as mentioned, allows for either aluminum (in the form of trivalent aluminum ions) 312 or iron to pass through from the cell containing the acidified liquids/waste 306 to the cell containing acid for coagulant recovery 308. The cell containing the acidified liquids/waste 306 has had the acidified sludge liquids added to it, and the waste, or the sludge not recovered in this process, exits this cell and may be neutralized and properly disposed. The cell containing acid for coagulant recovery 308 has had acid (e.g., sulfuric acid or hydrochloric acid) added to it to react with the aluminum or iron to produce the recovered coagulant. As such, as shown here, for each aluminum or iron molecule recovered, three hydrogen ions (protons) 314 pass through the cation exchange membrane 302 in the opposite direction as the aluminum 312 into the cell containing the acidified liquids 306.

Because the feed to the cell containing the acidified liquids waste 306 contains acid, the sulfate 316, or chloride in another example, from this cell passes through the anion exchange membrane 304 to the cell containing water for acid recovery 310. Water is fed into this cell, and recovered acid exits this cell. In addition to the sulfate 316 or chloride passing through the anion exchange membrane 304, two hydrogen ions (protons) 318 also pass through the anion exchange membrane 304 into the cell containing the water for acid recovery 310. As such, the cell containing acid for coagulant recovery 308 has a net gain of aluminum, the cell containing the acidified liquids/waste 306 has a net gain of one hydrogen ion (proton), and the cell containing water for acid recovery 310 has a net gain of sulfate and two hydrogen ions (protons) or chloride and one hydrogen ion (proton). While the embodiment of FIG. 3 uses alum as the coagulant (e.g., aluminum diffuses through the cation exchange membranes and sulfate diffuses through the anion exchange membranes), the same process would be applicable for different coagulants, such as coagulants containing iron instead of aluminum. As mentioned, the type of acid may be different, but the overall process would operate in a similar manner to that shown in FIG. 3.

FIG. 4 is a flow diagram illustrating a method 400 for simultaneously recovering coagulant and acid from acidified liquids, in accordance with an embodiment of the present invention. Initially, at step 402, sludge from a water treatment system or plant is contacted with acid to produce acidified liquids. The type of acid used to acidify the sludge depends on the coagulant used in the water treatment plant. For instance, if the coagulant is aluminum based, such as alum, sulfuric acid may be used, as it reacts with aluminum. Similarly, ferric sulfate coagulant reacts with sulfuric acid. However, when a coagulant, such as ferric chloride, is used, hydrochloric acid may be used, as it reacts with ferric chloride. The acidified liquids, at step 404, flow into a combined membrane treatment tank to simultaneously recover coagulant and acid. The recovered coagulant may be used in the water treatment plant. The recovered acid may be used to acidify the sludge from the plant.

The combined membrane treatment tank has both cation exchange membranes and anion exchange membrane so that the acid and coagulant from the acidified liquids can simultaneously be recovered by this process. Recovering coagulant from a water treatment plant without recovering the acid used to acidify it (e.g., to mobilize the coagulant) is not cost effective, as the savings of recovering coagulant typically does not outweigh the cost of the acid needed to recover the coagulant, as acid is needed in the coagulant recovery process. Metal cations (e.g., trivalent aluminum ions or iron ions) diffuse across the cation exchange membranes to form a recovered coagulant stream, and anions (e.g., sulfates or chlorides) diffuse across the anion exchange membranes to form a recovered acid stream. As used herein, metal cations are positively charged metal ions, or solubilized metals, that are able to diffuse across the cation exchange membranes into an acid solution or an acid sweep such that the metal cations are able to react with the acid, or a component thereof, to form recovered coagulant. Anions, as used herein, are negatively charged compounds from the acidified liquids that diffuse across the anion exchange membranes into a water solution such that the anions react with the water, or a component thereof, to form recovered acid. Further, in order to prevent solids precipitation in the acidified liquids, the diffusion rate of the metal cations across the cation exchange membranes is equal to or greater than the diffusion rate of the anions across the anion exchange membrane. If sulfuric acid is the acid used to acidify the solids and to recover the coagulant, sulfate may be the ion that passes through the anion exchange membranes. The diffusion rate of the sulfate across the anion exchange membranes should be less than or equal to the diffusion rate of the metal cations that diffuse across cation exchange membranes.

As mentioned, when the metal cations diffuse across the cation exchange membranes, they react with the acid to form the recovered coagulant stream. When the anions diffuse across the anion exchange membranes, the anions combine with hydrogen ions (protons) in the water to form the recovered acid stream. In one embodiment, the input streams into the combined membrane treatment tank include the acidified liquids, water for acid recovery, and acid for forming the recovered coagulant stream. Waste solids that are not recovered, the recovered coagulant stream, and the recovered acid stream are the output streams from the combined membrane treatment tank.

Referring now to FIG. 5, a flow diagram is depicted illustrating a method 500 for simultaneously recovering coagulant and acid from acidified liquids, in accordance with an embodiment of the present invention. At step 502, the method includes mixing sludge and acid in a mixing tank to produce acidified liquids. The sludge is produced from utilizing coagulant in the water treatment plant. The acid, in one embodiment is new acid, or acid not recovered using the process described herein. In another embodiment, the acid is recovered acid. Further, the coagulant may be an aluminum-based coagulant (e.g., alum) or an iron-based coagulant (e.g., ferric sulfate or ferric chloride).

At step 504, aluminum or iron is recovered as they diffuse across cation exchange membranes. If the metal cation is aluminum, trivalent aluminum ions diffuse across the cation exchange membrane into an acid solution cell and react with a sulfuric acid solution to form a recovered coagulant stream. Here, the coagulant may be alum. The recovered alum coagulant may be reused in the water treatment system. If the metal cation is iron, the iron ions diffuse across the cation exchange membrane into an acid solution cell and react with either a hydrochloric acid solution or a sulfuric acid solution to form a recovered acid stream. Anions are recovered as they diffuse across the anion exchange membranes into a water cell to form a recovered acid stream. The diffusion rates of the metal cations (e.g., aluminum or iron) and the anions (e.g., sulfates or chlorides) across the membranes may be approximately equal, in one embodiment. In an alternative embodiment, the diffusion rate of the metal cations may be greater than the diffusion rate of the anions. If the diffusion rate of the anions is greater than the diffusion rate of the metal cations, the solids in the acidified liquids may precipitate, which should be avoided.

Figure 6:
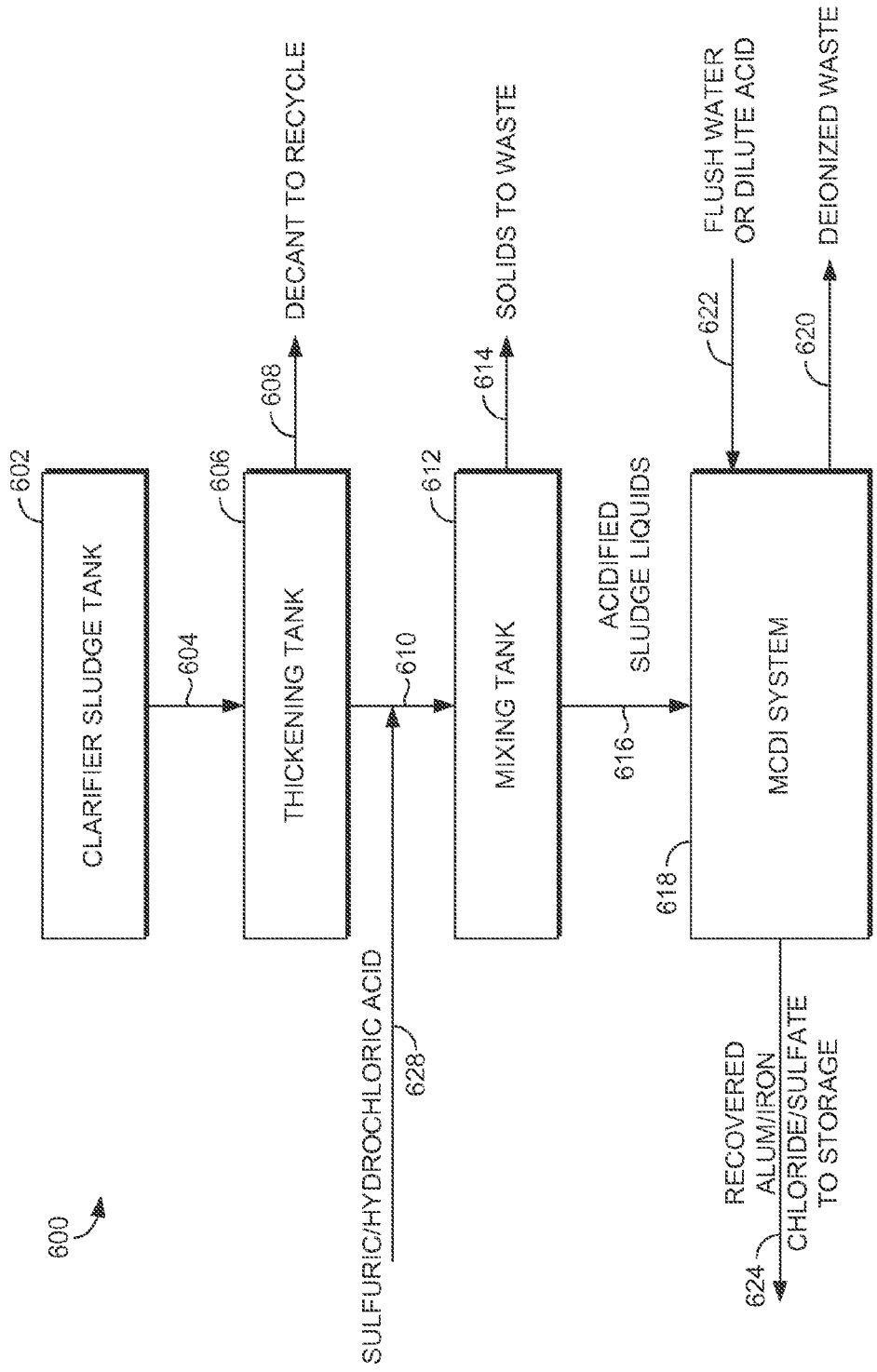
FIG. 6 illustrates a process flow diagram of a portion of a water treatment system that uses a Membrane Assisted Capacitive Deionization (MCDI) device to recover the coagulant, in accordance with an embodiment herein.

Turning now to FIG. 6, a process flow diagram 600 is illustrated of a portion of a water treatment system, in accordance with an embodiment of the present invention. The process flow diagram 600 represents just a portion of a water treatment plant that intakes wastewater and outputs clean water that can be reused. It should be noted that while four tanks are illustrated in the embodiment of FIG. 6, there may be more or less tanks used to accomplish embodiments of the present invention described herein, which include recovering coagulant used in the water treatment plant. The portion illustrated in FIG. 6 begins with a clarifier sludge tank 602 that intakes sludge from the water treatment plant and clarifies it. The output of this tank is clarified sludge 604, which flows into a thickening tank 606. The thickening tank 606 thickens the clarified sludge 604 by extracting water out of the clarified sludge, which is the decant stream 608, at least a portion of which that may be recycled. Decant, generally, is the liquid that is separated from the stream that includes the solids, which, here, is the thickened sludge 610. The thickened sludge 610 flows into a mixing tank 612 where acid 628 is mixed with the thickened sludge 610. The acid dissolves the dewatered sludge. Solids that did not dissolve by the acid in the mixing tank 612 are transferred for waste disposable, illustrated by line 614. In one instance, the mixing tank 612 is an acid resistant tank. Typically, use of acidification with sulfuric or hydrochloric acid to solubilize metals from the dewatered sludge occurs at a pH of 3 or below, with subsequent separation by decanting, centrifugation, or filtration.

Acidified sludge liquids 616 are produced in the mixing tank 612 and flow to an MCDI system 618, which includes, at least, both cation and anion exchange membranes, flow spacers and at least two carbon electrodes, the cathode and the anode. Organic matter in the acidified sludge liquids is rejected by the membranes in the MCDI system 618 and hence pass into the waste stream as a deionized waste 620. The MCDI system 618, along with using flush water or dilute acid 622, can recover the coagulant 624 (aluminum or iron) from the acidified sludge liquids, as will be discussed in more detail below. Dilute acid may be used if the pH of the recovered acid is not less than 3.0 to prevent precipitation of the coagulant.

The purified material, or recovered coagulant 624, can then be reused as coagulant in the water treatment plant. This, along with coagulant recovery, provides for reduced overall plant operation costs by reducing the amount of coagulant that needs to be purchased. Additionally, the quantity of residuals that are removed from the site and disposed of is also greatly reduced. As mentioned above, the final residuals (solids), or waste solids 614, are neutralized with lime, in one embodiment, and are disposed of accordingly. As will be discussed in more detail herein, the MCDI system 618 includes at least cationic and anionic exchange membranes, flow spacers and carbon electrodes that are arranged to allow the coagulant recovery process to occur such that the aluminum or iron ions diffuse into one stream with the sulfate or chloride ions. This combined process results in a smaller footprint and reduced tankage and pumpage. As such, fewer and perhaps smaller pumps may be needed.

Figure 7:
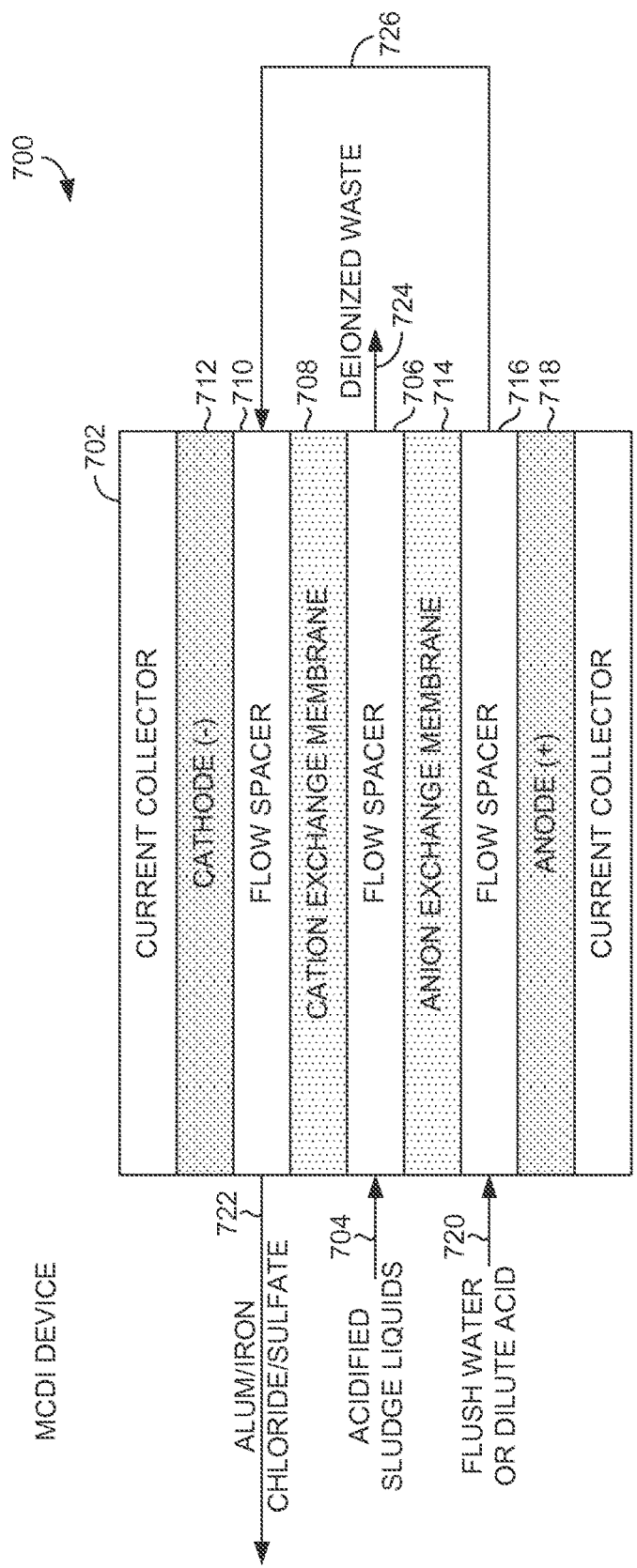
FIG. 7 illustrates a process flow diagram of an MCDI system for recovering coagulant, in accordance with an embodiment herein.

Turning now to FIG. 7, a process flow diagram 700 illustrates an MCDI system 702 for recovering coagulant, in accordance with an embodiment herein. The MCDI system 702 contains various components, including flow spacers 706, 710 and 716, at least one cathode 712, at least one anode 718, at least one cation exchange membrane 708, and at least one anion exchange membrane 714. The cation exchange membranes 708 allow for the aluminum or iron to pass through to flow spacer 710 and the cathode 712, but do not allow anions (e.g., sulfate or chloride ions) to pass through. The anion exchange membranes 714, on the other hand, allow anions (e.g., sulfate or chloride ions) to pass through, but do not allow the aluminum or iron ions to pass through. While the components mentioned above are illustrated in FIG. 7, the arrangement of cation/anion exchange membranes and of the various components represents just one exemplary embodiment. Alternative arrangements may also be used to carry out other embodiments herein.

As previously mentioned, sludge from the water treatment plant may first be clarified, thickened, and mixed with acid to form acidified sludge liquids, as shown in FIG. 6 herein. This acidified sludge liquid then enters the MCDI system 702 into flow spacer 706. When an electrical voltage difference is applied between the electrodes in the charging phase, cations (e.g., aluminum or iron ions) diffuse through the cation exchange membranes 708 and the flow spacer 710 and are adsorbed or immobilized at the cathode 712 which is negatively charged. Simultaneously, the anion exchange membranes 714 allow the anions (e.g., sulfate or chloride ions) to pass through to the flow spacer 716 and diffuse to the anode 718, which is positively charged. During the charging phase, both the cations and anions are immobilized at the cathode 712 and the anode 718 respectively. After the electrodes are saturated with ions, the adsorbed or immobilized ions need to be released for regeneration of the electrodes. For regeneration of the electrodes, the electrical voltage difference between the electrodes is reduced to zero or the polarity is reversed, leading to the charge relaxation/reversal phase. During the charge relaxation/reversal phase, different ions diffuse from the anode or cathode into the flow spacers, 710 and 716, facing the carbon electrodes. Additionally, during the charge relaxation/reversal phase, the chloride or sulfate ions at the anode are flushed out from the flow spacer 716 by flush water 720. Acid is recovered from flow spacer 716 and is recycled 726 to flush out cations (e.g. aluminum or iron ions) from flow spacer 710. Recovered coagulant and acid are collected from flow spacers 710 and 716. One or more stages of the MCDI can be used to achieve the desired degree of recovery. Organic matter in the acidified sludge liquids are rejected by the membranes and pass into the waste stream as a deionized waste 724.

The concentration of recovered coagulant may be controlled based on flow of water into the flow spacers between electrodes and ion exchange membranes during the charge relaxation/reversal phase. During the charge relaxation/reversal phase, the flow rate of flush water 720, in one embodiment, is greater than the diffusion rate of ions through the cation and anion exchange membranes, items 708 and 714 respectively, to ensure capture and removal of ions in the flow spacers 710 and 716 between the electrodes and the membranes. The feed of acidified sludge liquids 704 may pass through one or more stages of the MCDI system 702 to achieve the desired degree of separation and recovery. During the charging phase, voltage applied is limited to prevent water splitting or electrochemical oxidation of chloride ions at the anode.

Figure 8:
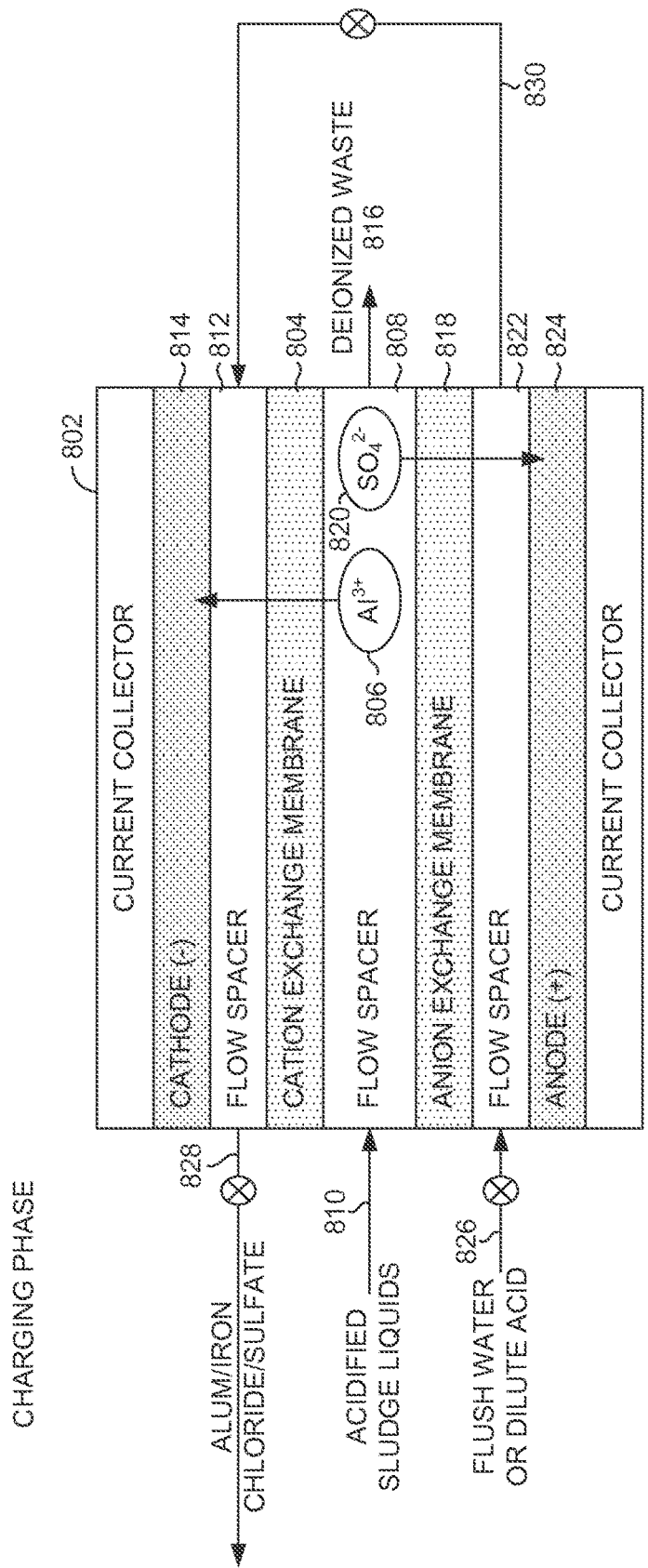
FIG. 8 illustrates a schematic diagram of an MCDI system for coagulant recovery during the charging phase, in accordance with an embodiment herein.

FIG. 8 illustrates a schematic diagram of a coagulant recovery process using an MCDI system during the charging phase, in accordance with an embodiment herein. Initially, the MCDI system 802 includes one or more cation exchange membranes 804, one or more anion exchange membranes 818, flow spacers 812 and 822, and one or more two carbon electrodes 814 and 824. The cation exchange membranes 804, as mentioned, allow for either aluminum 806 (in the form of trivalent aluminum ions) or iron to pass through from the flow spacer 808 containing the acidified sludge liquids 810 to the flow spacer 812 facing the cathode 814. The anion exchange membranes 818, on the other hand, allow only sulfate ions 820 or chloride ions to pass through from flow spacer 808 containing the acidified sludge liquids 810 to the flow spacer 822 facing the anode 824. While the embodiment of FIG. 8 uses alum as the coagulant (e.g., aluminum 806 diffuses through cation exchange membrane 804 and sulfate 820 diffuses through anion exchange membrane 818), the same process would be applicable for different coagulants, such as coagulants containing iron instead of aluminum. As mentioned, the type of acid may be different, but the overall process would operate in a similar manner to that shown in FIG. 8.

FIG. 8 illustrates the MCDI system 802 during the charging phase when an electrical voltage difference is applied between the carbon electrodes, the at least one cathode 814 and the at least one anode 824, to mobilize ions in the acidified sludge liquids 810. The MCDI system 802 during the charging phase is a closed system, where the only input is the acidified sludge liquids 810. As shown, there is no other input of flush water 826, output of recovered coagulant 828, or output of recycled acid 830 from flow spacer 822 to flow spacer 812, which differs from the embodiment of FIG. 9 as described in detail below. Using alum as the coagulant in the embodiment of FIG. 8, once the voltage is applied, the aluminum ions 806 start to diffuse through the cation exchange membranes 804 to the cathode 814 through the flow spacer 812, and the sulfate ions 820 diffuse through the anion exchange membranes 818 to the anode 824 through the flow spacer 822. During this charging phase, aluminum ions 806 and sulfate ions 820 are eventually adsorbed/immobilized at the cathode 814 and anode 824 respectively. Meanwhile, the organic matter in the acidified sludge liquids 810 rejected by the membranes pass into the waste stream as deionized waste 816. These steps of ionization of acidified sludge liquids, diffusion of cations and anions, and their adsorption/immobilization at the carbon electrodes continue until saturation takes place at the electrodes. Once the cathode 814 is saturated, the charge relaxation/reversal phase may take place to regenerate the carbon electrodes.

Figure 9:
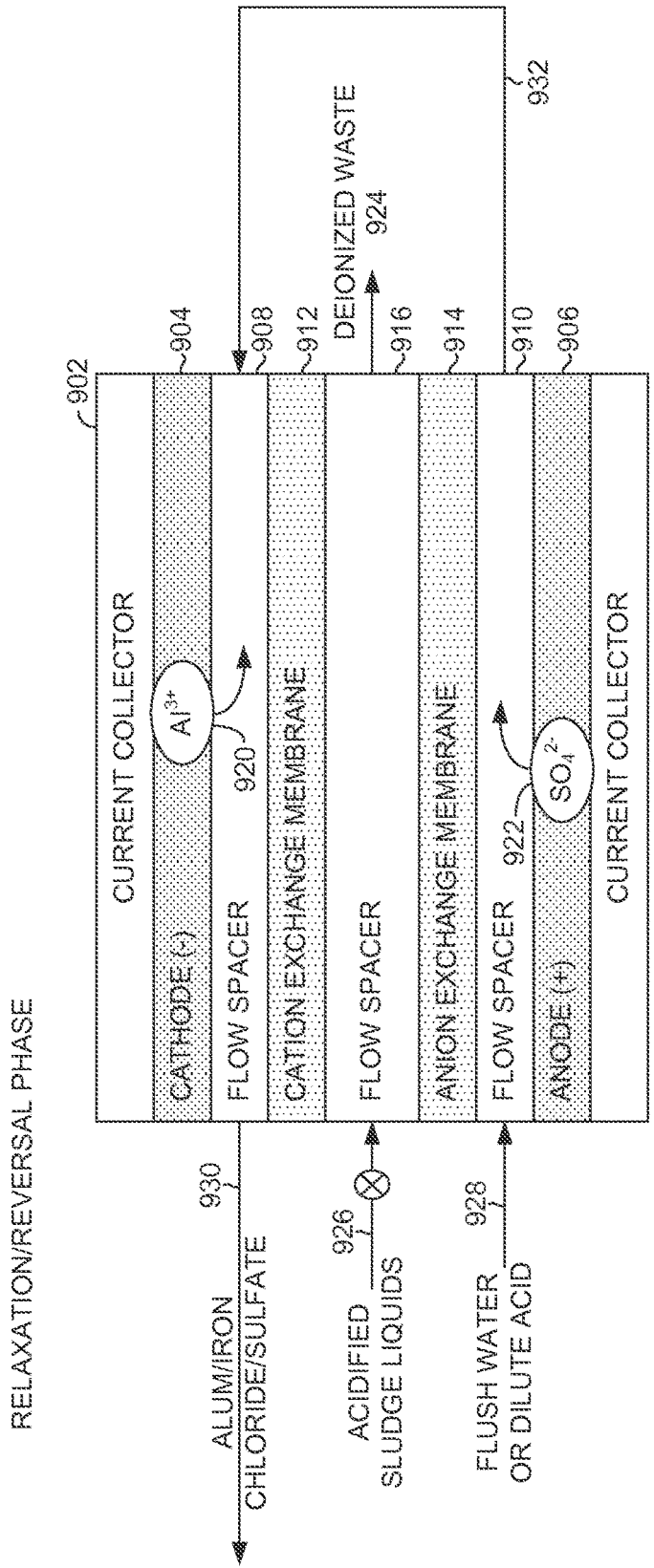
FIG. 9 illustrates a schematic diagram of an MCDI system for coagulant recovery during the relaxation/reversal phase, in accordance with an embodiment herein.

Referring to FIG. 9, a schematic diagram is shown of a coagulant recovery process using an MCDI system 902 during the charge relaxation/reversal phase, in accordance with an embodiment of the present invention. As mentioned above with regard to FIG. 8, at the end of the charging phase, the carbon electrodes are saturated with different ions and need to be regenerated. During the charge relaxation/reversal phase, the electrical voltage difference between the electrodes is reduced to zero or the polarity is reversed, enabling aluminum or iron ions 920 (or other metal ion) and sulfate or chloride ions 922 (or other anion) to leave the cathode 904 and the anode 906, respectively, and diffuse to flow spacers 908 and 910. In this way, ions leave the electrodes into the flow spacers and can be flushed out of the flow spacers using flush water or dilute acid 928 (dilute acid may be used if the pH of the recovered acid is higher than pH 3 to prevent precipitation of the coagulant). The flush water or dilute acid 928 flushes out sulfate ions 922 from flow spacer 910 and then flows to flow spacer 908 to flush out aluminum ions 920. Acid is recovered from flow spacer 910 and is recycled, by way of acid recycle stream 932, to flush out cations (e.g. aluminum or iron ions) from flow spacer 908, enabling the recovery of coagulant 930 as an output of flow spacer 908. During the charge relaxation/reversal phase, the flow rate of flush water or dilute acid 928, in one embodiment, is greater than the diffusion rate of ions through cation/anion exchange membranes, items 904 and 906, respectively, to ensure capture and removal of ions in the flow spacers 908 and 910 between the electrodes and the membranes. As shown in FIG. 9, acidified sludge liquids 926 do not enter the MCDI system 902, as there is no charge being applied to the electrodes.

Figure 10:
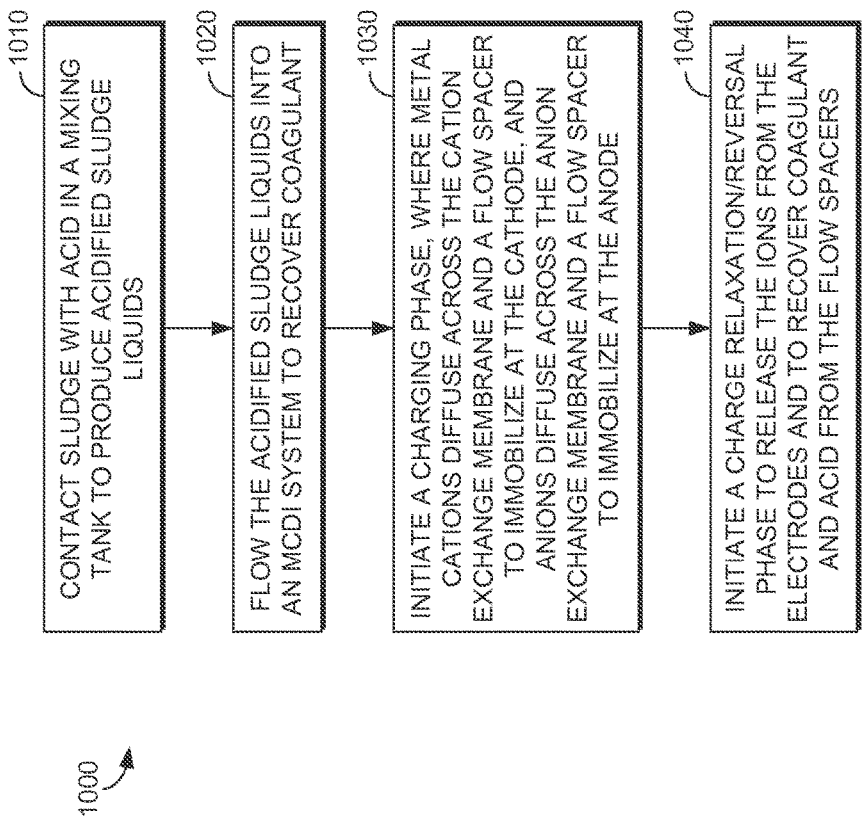
FIG. 10 is a flow diagram illustrating a method for recovering coagulant from acidified sludge liquids, in accordance with an embodiment herein.

Turning now to FIG. 10, a flow diagram is illustrated of a method 1000 for recovering coagulant from acidified sludge liquids, in accordance with an embodiment herein. Initially, at block 1010, sludge from a water treatment system or plant is contacted with acid and mixed in a mixing tank to produce acidified sludge liquids. The type of acid used to acidify the sludge depends on the coagulant used in the water treatment plant. For instance, if the coagulant is aluminum based, such as alum, sulfuric acid may be used, as it reacts with aluminum. Similarly, ferric sulfate coagulant reacts with sulfuric acid. However, when a coagulant, such as ferric chloride is used, hydrochloric acid may be used, as it reacts with ferric chloride. At block 1020, the acidified sludge liquids flow into an MCDI system to recover coagulant. The recovered coagulant may be used in the water treatment plant.

In an aspect, the MCDI system has cation exchange membranes, anion exchange membranes, flow spacers and one or more two carbon electrodes, a cathode and an anode to recover coagulant by this process. Metal cations (e.g., trivalent aluminum ions or iron ions) only diffuse across the cation exchange membranes, and only anions (e.g., sulfates or chlorides) diffuse across the anion exchange membranes. As used herein, metal cations are positively charged metal ions, or solubilized metals, that are able to diffuse across the cation exchange membranes such that the metal cations are able to react with the acid, or a component thereof, to form recovered coagulant. Anions, as used herein, are negatively charged compounds from the acidified liquids that diffuse across the anion exchange membranes into a water solution such that the anions react with the water, or a component thereof, to form recovered acid.

Initiating a charging phase, shown at block 1030, causes metal ions (e.g., trivalent aluminum ions) to diffuse across the cation exchange membranes and flow spacer to immobilize at the cathode, while anions (e.g., sulfates) diffuse across the anion exchange membranes and flow spacer to immobilize at the anode. After saturation of the cathode with aluminum ions, a charge relaxation/reversal phase is initiated, shown at block 1040, to release the ions from the electrodes to regenerate the electrodes. Both aluminum and sulfate diffuse from the electrodes into the flow spacers where the coagulant and the acid can be recovered.

Figure 11:
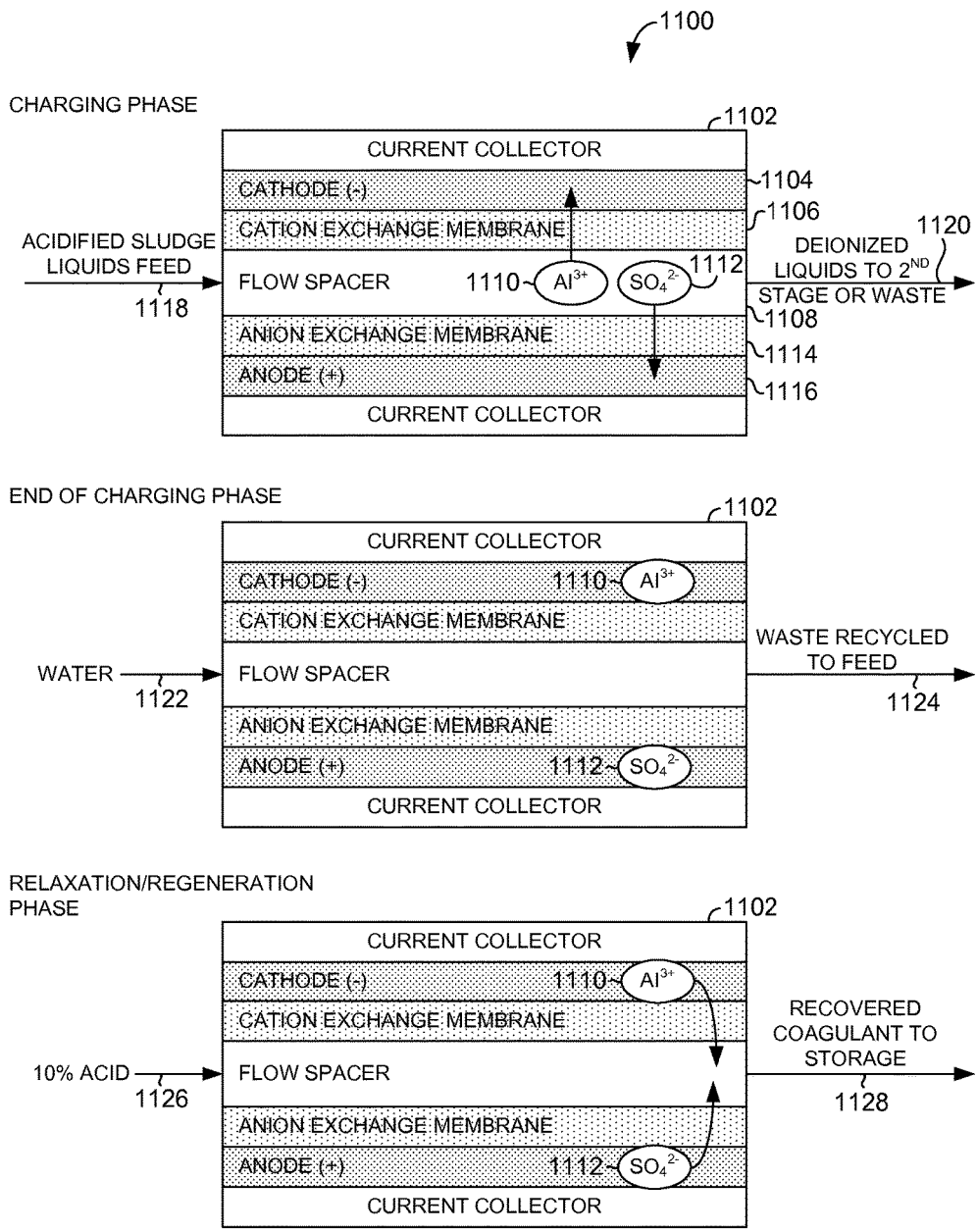
FIG. 11 illustrates a schematic diagram of an MCDI system for coagulant recovery during the charging and the relaxation/regeneration phases, in accordance with an embodiment herein.

Turning now to FIG. 11, a process flow diagram 1100 illustrates an MCDI 1102 for recovering coagulant, in accordance with an embodiment herein. The MCDI system 1102 contains various components, including flow spacer 1108, at least one cathode 1104, at least one cation exchange membrane 1106, at least one anode 1112, and at least one anion exchange membrane 1114. The at least at least one cathode 1104 is mounted directly on to the at least one cation exchange membrane 1106 on one side of the flow spacer 1108. On the other side of flow spacer 1108, the at least one anode 1116 is mounted directly on to the at least one anion exchange membrane 1114. While the components mentioned above are illustrated in FIG. 11, the arrangement of cation/anion exchange membranes and of the various components represents just one exemplary embodiment. Alternative arrangements may also be used to carry out other embodiments herein.

As previously mentioned in FIG. 6 herein, sludge from the water treatment plant may first be clarified, thickened, and mixed with acid to form acidified sludge liquids. This acidified sludge liquid then enters the MCDI system 1102 through flow spacer 1108. When an electrical voltage difference is applied between the electrodes in the charging phase, cations (e.g., aluminum or iron ions) diffuse through the cation exchange membranes 1106 and are adsorbed or immobilized at the cathode 1104, which is negatively charged. Simultaneously, the anion exchange membranes 1114 allow the anions (e.g., sulfate or chloride ions) to pass to the anode 1116, which is positively charged. The deionized liquids 1120 either go to a second stage or go to waste.

By the end of the charging phase, the electrodes are saturated with the adsorbed or immobilized ions, 1110 and 1112. The feed of acidified sludge liquid 1118 is stopped and the flow spacer 1108 is flushed with water 1122 while the resulted waste is recycled to feed 1124. For regeneration of the electrodes, the electrical voltage difference between the electrodes is reduced to zero or the polarity is reversed, leading to the charge relaxation/reversal phase. During the charge relaxation/regeneration phase, the flow spacer 1108 is fed with acid 1126 (e.g., hydrochloric or sulfuric acid) to recover the ions and form the recovered coagulant. During the charge relaxation/regeneration phase, both the cations and anions, 1110 and 1112, diffuse from the anode 1116 or cathode 1104 into the flow spacer 1108. Recovered coagulant and acid are collected from flow spacer 1108 and transferred to storage 1128. Once the charge relaxation/regeneration phase is complete, the feed of the acidified sludge liquids is restarted to feed the flow spacer 1108. One or more stages of the MCDI can be used to achieve the desired degree of separation and recovery.

Figure 12:
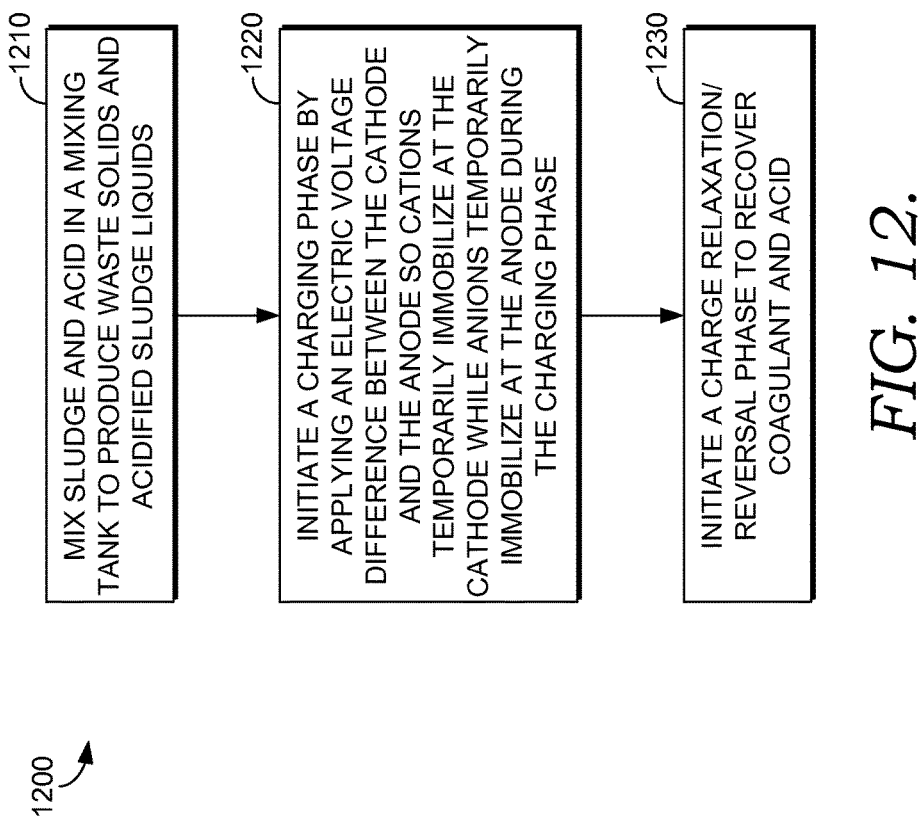
FIG. 12 is a flow diagram demonstrating a method for recovering coagulant from acidified sludge liquids, in accordance with an embodiment herein.

Referring now to FIG. 12, a flow diagram is depicted illustrating a method 1200 for recovering coagulant from acidified sludge liquids, in accordance with an embodiment herein. At block 1210, the method includes mixing sludge and acid in a mixing tank to produce waste solids and acidified sludge liquids. The sludge is produced from utilizing coagulant in the water treatment plant. The coagulant may be an aluminum-based coagulant (e.g., alum) or an iron-based coagulant (e.g., ferric sulfate or ferric chloride).

At block 1220, a charging phase is initiated in an MCDI system having at least one cathode that is separated with a first flow spacer from at least one cation exchange membrane and at least one anode which is separated with a second flow spacer from at least one anion exchange membrane. The charging phase is initiated by applying an electric voltage difference between the at least one cathode and the at least one anode to separate aluminum or iron ions from anions during the charging phase. The aluminum or iron ions diffuse across the at least one cation exchange membrane and the first flow spacer to temporarily immobilize at the at least one cathode, and the anions (sulfates or chlorides) diffuse across the at least one anion exchange membranes and the second flow spacer to temporarily immobilize at the at least one anode during the charging phase. The electric voltage difference used during the charging phase is limited to prevent water splitting or electrochemical oxidation of the anions at the at least one anode.

Initiating a charge relaxation/reversal phase, shown at block 1230, recovers aluminum or iron ions as they diffuse into the first flow spacer between the at least one cathode and the at least one cation exchange membrane. The aluminum or iron ions react with a sulfuric acid solution or a hydrochloric acid solution to form recovered coagulant during the charge relaxation/reversal phase. Anions are recovered as they diffuse into the second flow spacer between the at least one anode and the at least one anion exchange membrane to form recovered acid during the charge relaxation/reversal phase. The diffusion rate of the aluminum or iron ions across the at least one cation exchange membrane or the diffusion rate of the anions across the at least one anion exchange membrane is slower than a flow rate of flush water in a third flow spacer between the at least one cation exchange membrane and the at least one anion exchange membrane. The recovered coagulant is reused in the water treatment system as the coagulant.

It should be noted that while embodiments of the present invention described herein are described with respect to aluminum and iron coagulants used in a water treatment plant, other chemical formulations or waste streams from other processes other than water treatment plants may be used in the systems described herein. For instance, industries other than water may utilize coagulants or other chemical products that may be recovered using embodiments described herein. Also, whether alum, an iron coagulant, or any other coagulant is used in the plant, the process of recovering coagulant and acid described herein can be used.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure. Further, alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A process for recovering coagulant and acid in a water treatment system, the process comprising:
   contacting sludge from a water treatment system with acid to produce acidified sludge liquids;
   flowing the acidified sludge liquids into a membrane assisted capacitive deionization system that comprises at least one cathode that is separated by a first flow spacer from at least one cation exchange membrane and at least one anode that is separated by a second flow spacer from at least one anion exchange membrane to recover the coagulant and the acid from the acidified sludge liquids;
   initiating a charging phase of the membrane assisted capacitive deionization system where an electric voltage difference is applied between the at least one cathode and the at least one anode, wherein during at least a portion of the charging phase, metal cations diffuse across the at least one cation exchange membrane and the first flow spacer to temporarily immobilize at the cathode, and anions diffuse across the at least one anion exchange membrane and the second flow spacer to temporarily immobilize at the at least one anode;
   initiating a charge relaxation/reversal phase during which the coagulant and the acid from the first and the second flow spacers are recovered, wherein the electric voltage difference between the at least one cathode and the at least one anode is either reduced to zero or the polarity is reversed; and
   recycling recovered acid from the second flow spacer adjacent to the at least one anode to the first flow spacer adjacent to the at least one cathode.

2. The process of claim 1, wherein the recovered acid and the recovered coagulant can be used to treat the sludge from the water treatment system.

3. The process of claim 1, wherein the acidified liquids pass through one or more membrane assisted capacitive deionization systems to achieve the desired degree of separation and recovery.

4. The process of claim 1, wherein the acidification of the sludge from the water treatment system takes place at a pH of 3 or below.

5. The process of claim 1, wherein the metal cations are positively charged metal ions that react with the acid to form recovered coagulant that is reused in the water treatment system.

6. The process of claim 1, wherein the coagulant is alum such that the metal cations are trivalent aluminum ions, the anions are sulfates, and the recovered acid is sulfuric acid.

7. The process of claim 1, wherein the coagulant is ferric chloride such that the metal cations are iron ions, the anions are chlorides, and the recovered acid is hydrochloric acid.

8. The process of claim 1, wherein the coagulant is ferric sulfate such that the metal cations are iron ions, the anions are sulfates, and the recovered acid is sulfuric acid.

9. The process of claim 1, wherein the acidified sludge liquids and flush water or dilute acid are input streams into the membrane assisted capacitive deionization system and deionized waste and recovered coagulant are outputs from the membrane assisted capacitive deionization system, and wherein at least a portion of the acid is recycled within the membrane assisted capacitive deionization system.

10. A process for recovering coagulant and acid in a water treatment system, the process comprising:

upon utilizing the coagulant in the water treatment system where sludge is produced, mixing the sludge in a mixing tank with the acid to produce waste solids and acidified sludge liquids, wherein the coagulant is a polyvalent metal coagulant; and in a membrane assisted capacitive deionization system having at least one cathode that is separated with a first flow spacer from at least one cation exchange membrane and at least one anode that is separated with a second flow spacer from at least one anion exchange membrane, (1) initiating a charging phase by applying an electric voltage difference between the at least one cathode and the at least one anode to separate aluminum or iron ions from anions during the charging phase, wherein the aluminum or iron ions diffuse across the at least one cation exchange membrane and the first flow spacer to temporarily immobilize at the at least one cathode, and the anions diffuse across the at least one anion exchange membranes and the second flow spacer to temporarily immobilize at the at least one anode during the charging phase, (2) initiating a charge relaxation/reversal phase to recover the aluminum or iron ions as they diffuse into the first flow spacer between the at least one cathode and the at least one cation exchange membrane, wherein the aluminum or iron ions react with a sulfuric acid solution or a hydrochloric acid solution to form recovered coagulant during the charge relaxation/reversal phase, and (3) recovering the anions as they diffuse into the second flow spacer between the at least one anode and the at least one anion exchange membrane to form recovered acid during the charge relaxation/reversal phase.

11. The process of claim 10, wherein the aluminum is trivalent aluminum ions, and wherein the recovered coagulant is alum.

12. The process of claim 10, wherein the electric voltage difference used during the charging phase is limited to prevent water splitting or electrochemical oxidation of the anions at the at least one anode.

13. The process of claim 10, wherein the recovered coagulant is reused in the water treatment system as the coagulant.

14. The process of claim 10, wherein a diffusion rate of the aluminum or iron ions across the at least one cation exchange membrane or the diffusion rate of the anions across the at least one anion exchange membrane is slower than a flow rate of flush water or dilute acid in a third flow spacer between the at least one cation exchange membrane and the at least one anion exchange membrane.

15. The process of claim 10, wherein the anions are one or more of sulfates or chlorides that react with water in the flow spacer to form sulfuric acid or hydrochloric acid.

* * * * *